J. GOODFELLOW.
PROTRACTOR.
APPLICATION FILED FEB. 11, 1910.
1,008,814.
Patented Nov. 14, 1911.
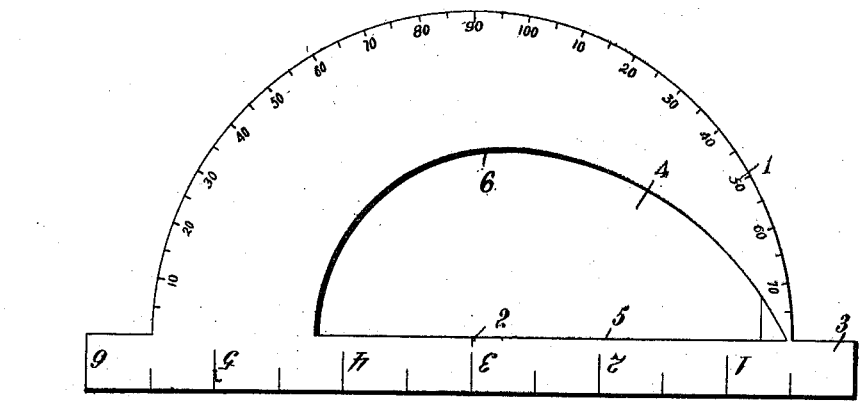
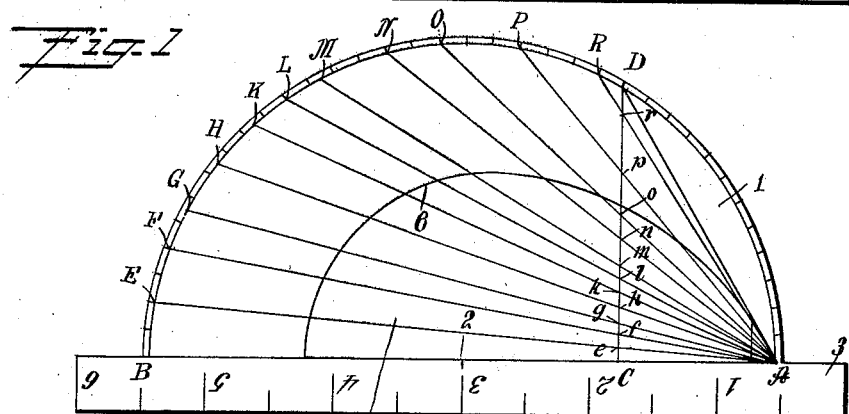
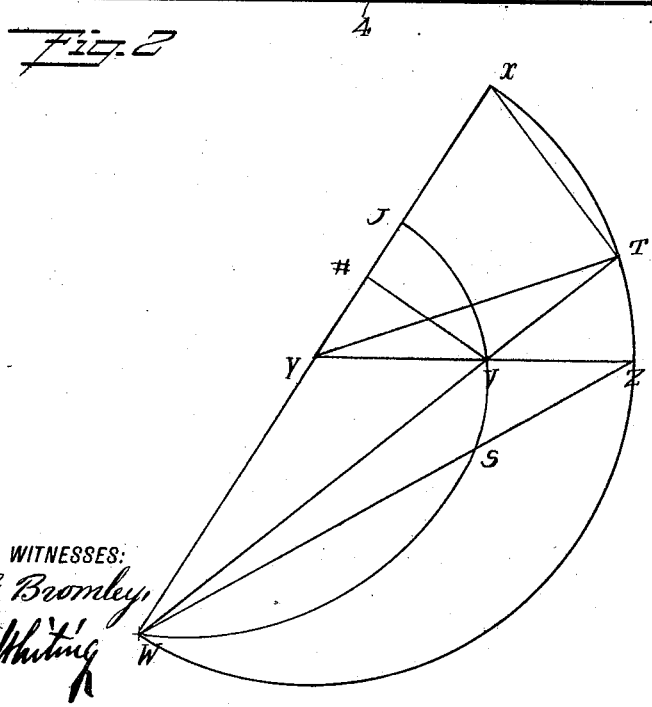
WITNESSES:
E. G. Bromley
H. Whiting
INVENTOR
Joseph Goodfellow
BY Munn & Co.
ATTORNEYS

UNITED STATES PATENT OFFICE.

JOSEPH GOODFELLOW, OF VANCOUVER, BRITISH COLUMBIA, CANADA.

PROTRACTOR.

1,008,814.     Specification of Letters Patent.     Patented Nov. 14, 1911.

Application filed February 11, 1910. Serial No. 543,264.

*To all whom it may concern:*

Be it known that I, JOSEPH GOODFELLOW, a subject of the King of Great Britain, and a resident of Vancouver, in the Province of British Columbia and Dominion of Canada, have invented a new and Improved Protractor, of which the following is a full, clear, and exact description.

This invention relates to a new and improved protractor, of a type in which the various angles are designated on an arcuate periphery, whereby they may be transferred to any suitable work; and which is further provided with a supplementary arc or curve for determining various points and aiding in the solution of various geometrical problems.

An object of this invention is to provide a device which will be simple in construction, inexpensive to manufacture, simple in its use, and comparatively accurate in its results.

A further object of this invention is to provide a protractor with various curves and reference points whereby various geometrical problems may be solved in a simple and convenient manner.

These and further objects, together with the construction and combination of parts, will be more fully described hereinafter and particularly set forth in the claim.

Reference is to be had to the accompanying drawings forming a part of this specification, in which similar characters of reference indicate corresponding parts in all the views, and in which—

Figure 1 is a face view of the protractor; Fig. 2 illustrates the method of obtaining the inner arc or curve of the protractor; and Fig. 3 is a diagram illustrating the solution of a geometrical problem by means of this device.

Referring more particularly to the separate parts, 1 indicates the body of the protractor, which is in the form of a semi-circular disk of any suitable material, having its outer periphery divided by suitable indicating marks into degrees of a circle, whose center is indicated at 2.

The body portion 1 of the protractor is provided with an extension 3, the outer edge of which runs parallel to the diameter of the protractor arc, and which is suitably divided into units of measure by suitable reference marks.

The body of the protractor 1 has a cut-out portion 4, whose base 5 preferably coincides with the diameter of the protractor arc which passes through the extremities of the protractor arc. The remaining edge or boundary of this cut-out space of the protractor is formed by a curve 6, which is obtained in a peculiar manner. The method of obtaining this curve is more clearly illustrated in Fig. 2.

A base line A B is assumed, which approximately equals the diameter of the protractor arc, and a distance A C laid off thereon, which is just one-quarter of the length of A B. A line C D is then drawn at the point C perpendicular to the line A B. A number of radiating lines are then drawn from A to the circumference of a circle A D B drawn through the points A D B with the point 2 as a center. These lines intersect the arc of the circle A D B in the points E, F, G, H, K, L, M, N, O, P, R. These radiating lines A E, A F, etc., also intersect the line C D in the points e, f, g, h, k, l, m, n, o, p, r, respectively. With the points E, F, G, H, K, L, etc., as centers, and with radii equal to the distances Ae, Af, Ag, Ah, Ak, Al, etc., arcs are struck intersecting the lines A E, A F, etc., thereby plotting the curve 6. The curve 6 can be then drawn through these points, and is utilized with the protractor in obtaining the solutions of various geometrical problems. One of these problems is indicated in Fig. 3. Let us assume that we wish to find one-third of any given angle X Y Z. The protractor is applied to the angle X Y Z in such a manner that the point 2 coincides with the point Y on the angle, and also so that the line 2 B coincides with the line Y X. The curve 6 will then intersect the line Y Z at a point V. An arc is then drawn connecting the points X Z, which corresponds to the outer periphery of the protractor. If a line is now drawn from a point W, which coincides with the point A on the protractor, through the point V, the projection thereof will intersect the arc X Z at a point T. If the points Y and T are then connected, the angle T Y Z will equal one-third the angle X Y Z. In order to demonstrate the truth of this proposition, let X Y Z be any angle. Apply the protractor according to instructions above, so that its center will coincide with Y, its diameter will fall along X W, and X W produced. The outer semicircular rim X T Z W will cut X W at X and W.

The inserted curve J V S W will cut Y Z at V; join W and V, and produce W V to T; join T Y, then the angle T Y Z equals one-third the angle X Y Z.

Proof: Since the curve J V S W is such that any line drawn to the circumference from the point where the curve, diameter and circumference meet is cut so that the rectangle contained by the segment intercepted between the said point and the circumference, and the segment intercepted between the curve and the circumference is equal to the square on the radius, therefore W T times T V equals Y T². Therefore, triangles Y T V, T W Y are similar; thus angle T Y Z equals angle Y W T. Since Y T equals Y W, then the angle Y W T equals angle Y T W; therefore, angle T Y Z equals angle Y W T equals angle Y T W. Further, inasmuch as the exterior angle of a triangle is equal to the sum of the two opposite interior angles of the triangle, then the angle Y V W equals the angle T Y Z plus the angle Y T W, and the angle X Y Z equals the angle Y V W plus the angle Y W V. Therefore the angle X Y Z equals the angle T Y Z, plus the angle Y T W plus the angle Y W T equals three times the angle T Y Z; therefore the angle T Y Z equals one-third the angle X Y Z. This indicates but one of many solutions, which may be worked out with the aid of this protractor.

While the arc of circle utilized in Fig. 2 for determining the points E. F. G., etc., has been shown separate from the outer periphery of the protractor, the difference therebetween is intended to be so slight that it practically coincides therewith. It is to be noted that the curve 6 varies in distance from the point A from zero up to three-fourths the diameter A B, which is substantially the diameter of the periphery arc of the protractor. It is also to be noted that this same curve 6 varies in distances from the semi-circle A D B or substantially from the periphery arc of the protractor distances varying from zero up to one-fourth of the diameter A B. It can further be proven by a simple geometrical proposition that the distance A D is twice the distance C A, therefore the arcs by which the curve 6 is determined have radii varying from one-fourth the diameter of the protractor circle to one-half the diameter of the protractor circle. The curve 6 can further be represented by a mathematical equation, the derivation of which may be worked out as follows:—Referring to Fig. 3, make the line V # perpendicular to the line X W; symbolize X W by 2 A (A representing the radius of a circle); # W by Y; # V by X, and let K represent the line W V, and N represent the line V T. Then $$N(K+N) = WT \times TV = A^2$$

and $$\frac{K}{Y} = \frac{2A}{K+N}$$
$$\therefore K^2 + KN = 2AY$$

and $$N = \frac{2AY - K^2}{K}$$

Substituting the value of K $$N = \frac{2AY - X^2 - Y^2}{\sqrt{X^2 + Y^2}}$$

Now $$K + N = \frac{2AY - X^2 - Y^2}{\sqrt{X^2 + Y^2}} + \sqrt{X^2 + Y^2}$$
$$= \frac{2AY}{\sqrt{X^2 + Y^2}}$$

and thus $$N(K+N) = \frac{2AY}{\sqrt{X^2 + Y^2}} \times \frac{2AY - X^2 - Y^2}{\sqrt{X^2 + Y^2}}$$
$$= \frac{4A^2Y^2 - 2AYX^2 - 2AY^3}{X^2 + Y^2}$$

$$\therefore 4A^2Y^2 - 2AY = A^2X^2 - 2AY^3 = A^2X^2 + A^2Y^2$$
$$\therefore 3A^2Y^2 - 2AYX^2 - 2AY^3 = A^2X^2 = O$$
$$\therefore 3AY^2 - 2YX^2 - 2Y^3 = AX^2 = O$$
$$\therefore Y^2(3A - 2Y) - X^2(2Y + A) = O$$

this last equation being the equation of the curve 6.

Having thus described my invention, I claim as new and desire to secure by Letters Patent:—

A protractor, comprising a body portion having a protractor circle thereon and having an opening therein, a portion of whose boundary is determined by a curve the equation of which is $$Y^2(3A-2Y) - X^2(2Y+A) = O,$$

the axis of X being a tangent and the axis of Y a diameter of the circle of which A is a radius.

In testimony whereof I have signed my name to this specification in the presence of two subscribing witnesses.

JOSEPH GOODFELLOW.

Witnesses:
  John H. Buchanan,
  Angus M. McIver.